United States Patent
Rosskamp

(10) Patent No.: US 7,100,551 B2
(45) Date of Patent: *Sep. 5, 2006

(54) TWO-CYCLE ENGINE WITH FORWARD SCAVENGING AIR POSITIONING AND SINGLE-FLOW CARBURETOR

(75) Inventor: Heiko Rosskamp, Adelberg (DE)

(73) Assignee: Andreas Stihl AG & Co. KG, (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/032,472

(22) Filed: Jan. 10, 2005

(65) Prior Publication Data

US 2005/0120985 A1  Jun. 9, 2005

Related U.S. Application Data

(63) Continuation-in-part of application No. 10/305,616, filed on Nov. 26, 2002, now Pat. No. 6,889,637.

(30) Foreign Application Priority Data

Dec. 10, 2001  (DE) ............................... 101 60 539

(51) Int. Cl.
*F02B 17/00* (2006.01)
(52) U.S. Cl. ................................................ 123/73 PP
(58) Field of Classification Search ............ 123/73 PP, 123/73 A, 73 R, 73 B; 261/23.3, 23.1
See application file for complete search history.

(56) References Cited

U.S. PATENT DOCUMENTS

| 6,101,991 A | 8/2000 | Glover |
| 6,889,637 B1 * | 5/2005 | Rosskamp .............. 123/73 PP |

* cited by examiner

*Primary Examiner*—Henry C. Yuen
*Assistant Examiner*—Hyder Ali
(74) *Attorney, Agent, or Firm*—Robert W Becker & Associates; Robert W Becker

(57) ABSTRACT

A two-cycle engine 1 is provided and has a cylinder in which is formed a combustion chamber that is delimited by a piston which, via a connecting rod, drives a crankshaft rotatably mounted in a crankcase. The engine has an air duct that communicates with a transfer channel, and a mixture channel via which fuel/air mixture is drawn into the crankcase. At least a portion of the length of the mixture channel is separated from the air duct by a dividing wall that extends in a direction of flow of the air. The dividing wall separates the channels from one another in such a way that the ratio of the cross-sectional area of the mixture channel to the cross-sectional area of the air duct is approximately in the range of 0.5 to 1.9.

20 Claims, 5 Drawing Sheets

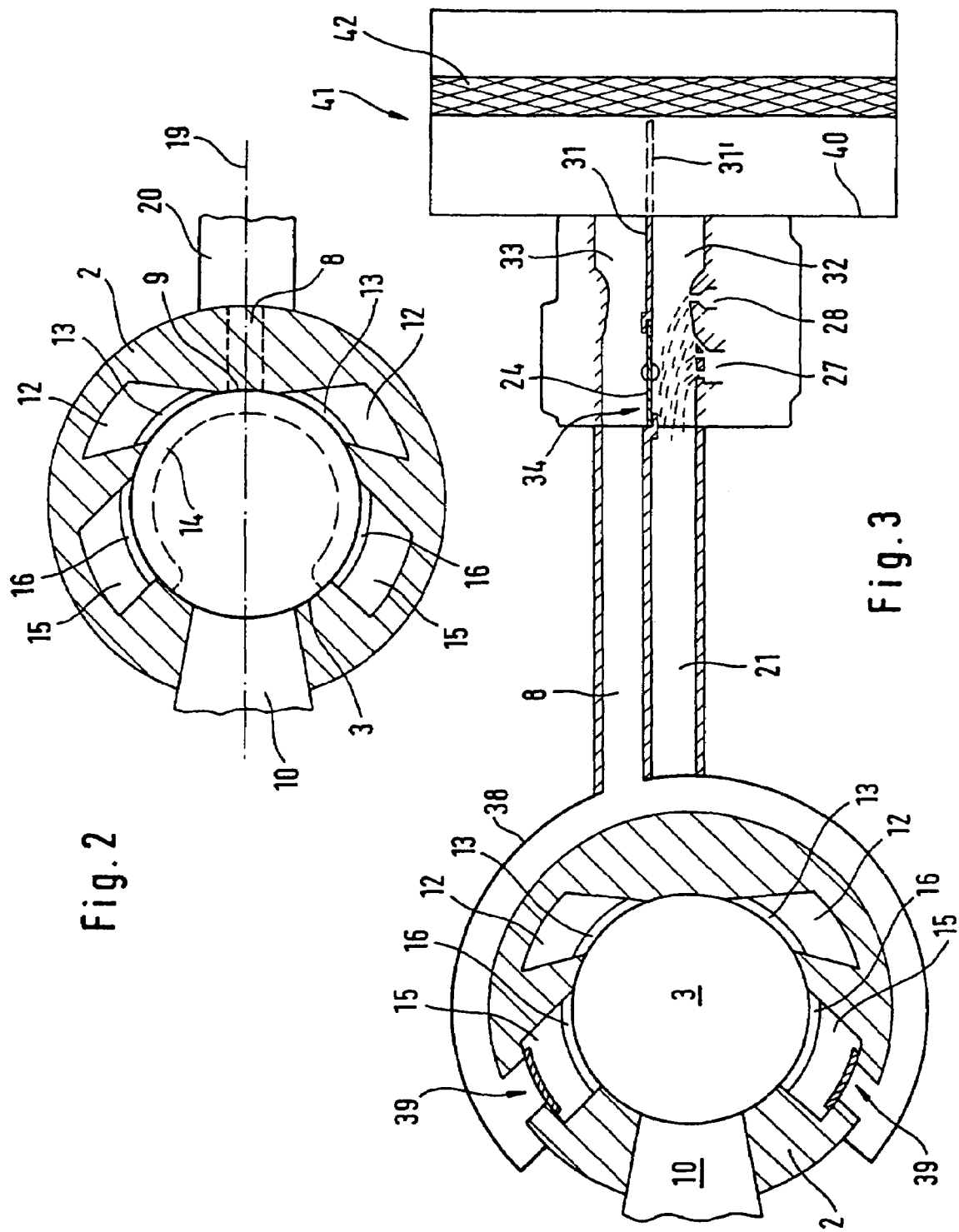

TWO-CYCLE ENGINE WITH FORWARD SCAVENGING AIR POSITIONING AND SINGLE-FLOW CARBURETOR

RELATED APPLICATION

This application is a continuation-in-part of U.S. patent application Ser. No. 10/305,616 filed on Nov. 26, 2002 now U.S. Pat. No. 6,889,637.

BACKGROUND OF THE INVENTION

The present invention relates to a two-cycle engine, especially as a drive engine in a portable, manually-guided tool or implement such as a power chain saw, a brush cutter, a trimmer, a cut-off machine, etc.

A two-cycle engine of this type is known from DE 199 00 445 A1. A combustion chamber formed in the cylinder is connected to the crankcase via transfer passages, the mixture required for combustion being conveyed to the crankcase. In order to ensure that as little uncombusted fuel as possible is lost through the exhaust or outlet during the scavenging of the combustion chamber, the transfer passages close to the exhaust are connected to an air duct and fuel-free air is drawn in through the transfer passages during the intake stroke. The air is then held at the front of the transfer passages and enters first the next time the mixture transfers into the combustion chamber. The mixture flowing out of the crankcase follows some time later and the scavenging losses flowing out of the exhaust during the scavenging of the combustion chamber come largely from the forward positioned scavenging air.

In practice, a number of problems occur during the metering of the fuel required to operate the internal combustion engine by a carburetor. For example, at idle it is necessary to guarantee that the air duct is fully closed in order to prevent the idle mixture becoming too lean in an uncontrolled manner in the combustion chamber as a result of the air flowing into it. During acceleration, too, the opening of the air duct renders the mixture too lean as a result of which the speed of the internal combustion engine increases only reluctantly to the desired level.

On the other hand, it is important to guarantee that the air duct remains as free as possible from fuel at full throttle in order that the significant reduction in exhaust gas emissions which the forward positioned scavenging air is designed to achieve can be obtained.

The invention is based on the object of designing a two-cycle engine of the aforementioned type in such a manner that it is possible to reliably prevent the mixture in the combustion chamber from becoming too lean at idle and part throttle while retaining the advantageous effects of the supply of fuel-free air with which to scavenge the combustion chamber at full throttle.

BRIEF DESCRIPTION OF THE DRAWINGS

This object, and other objects and advantages of the present invention, will appear more clearly from the following specification in conjunction with the accompanying schematic drawings, in which:

FIG. 2 is a schematic section along the line marked II—II in FIG. 1;

FIG. 3 is a schematic view of a section of a membrane-controlled system with forward scavenging air positioning as illustrated in FIG. 2;

SUMMARY OF THE INVENTION

Figure 1:
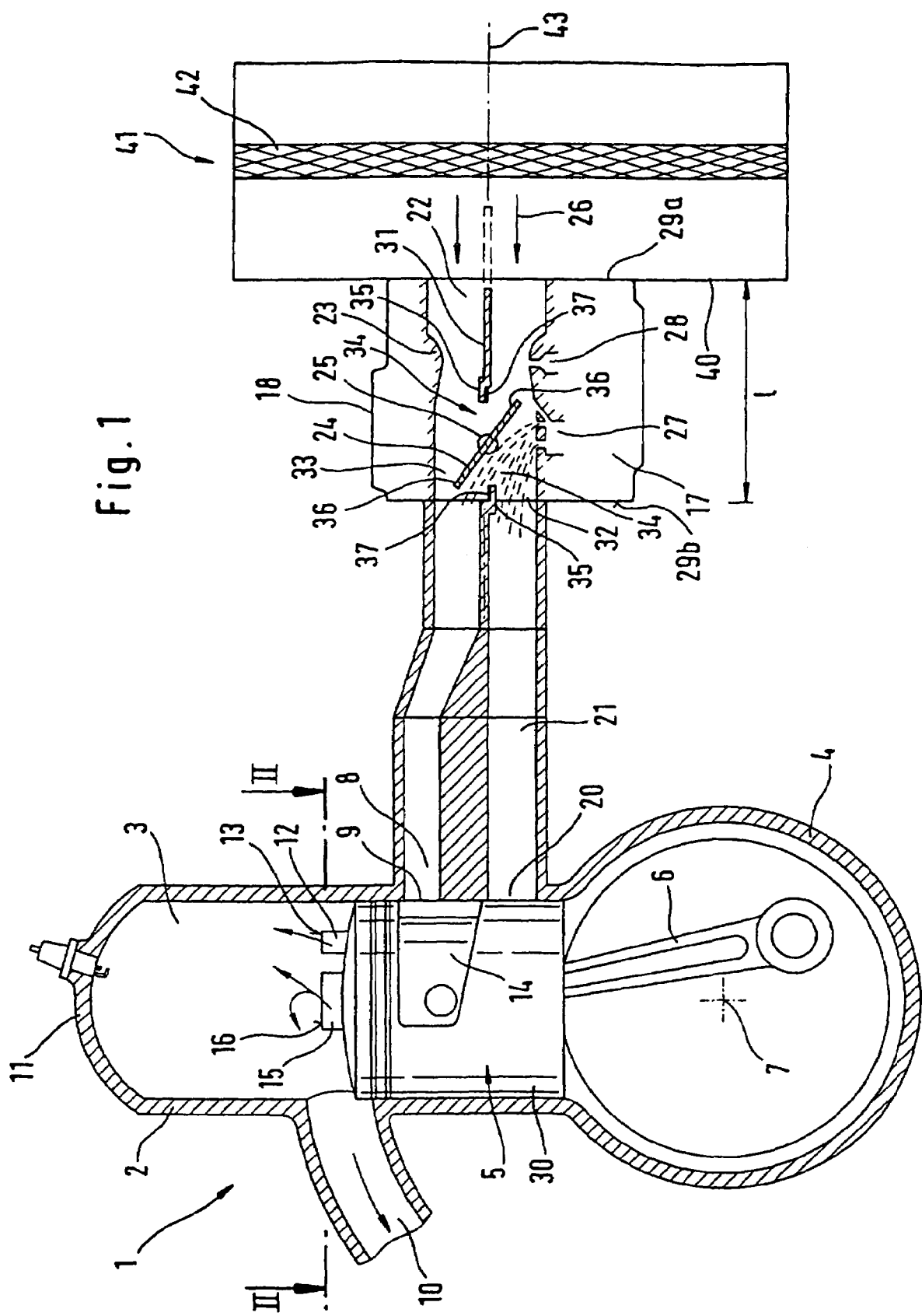
FIG. 1 is a schematic view of a two-cycle engine with port-controlled forward scavenging air positioning and a single-flow carburetor.

A dividing wall separates the intake duct in the direction of the longitudinal central axis into a mixture channel and an air duct. In this connection, the dividing wall separates air duct and mixture channel from one another in such a way that the ratio of the cross-sectional area of the mixture channel to the cross-sectional area of the air duct is approximately in the range of from 0.5 to 1.9. As a result, the quantity of the air previously collected in the transfer channels can be well coordinated with the quantity of fuel/air mixture supplied to the two-cycle engine. As a result rinsing or scavenging of the combustion chamber with extensively fuel-free air can be achieved, so that no fresh mixture can escape from the outlet. Low exhaust gas values of the two-cycle engine can be achieved. A making lean of the mixture in the combustion chamber is avoided due to the coordinated quality of scavenging air.

The dividing wall advantageously separates the channels in such a way that the ratio of the cross-sectional area of the mixture channel to the cross-sectional area of the air channel is approximately in the range of approximately 0.54 to 1.86. With such a separation of the cross-sectional areas, good exhaust gas values are achieved while also achieving an adequate supply of fuel/air mixture. The dividing wall is essentially provided along the entire length of the intake duct from one front face of the carburetor body to its other front face in such a manner that even fuel precipitating due to return pulsation upstream of the butterfly or throttle valve is unable to simply pass into the air duct. A connecting aperture is formed in the dividing wall in the pivot region of the throttle valve. At full throttle the throttle valve closes the connecting aperture in the dividing wall in such a manner that the dividing wall, which extends as far as the upstream front face, opposes any transfer of fuel upstream of the throttle valve. The dividing wall preferably extends as far as the base of an air filter fitted upstream of the carburetor, expediently into the air filter housing and in particular as far as the filter element itself. The extension of the dividing wall upstream of the throttle valve into the filter housing achieves a functional division of air duct and mixture duct on the intake side.

The design disclosed in the invention ensures that the pressure prevailing in the venturi at idle and part throttle corresponds to the joint pressure in the air duct and the mixture duct. The volume of fuel conveyed into the venturi in accordance with this joint underpressure is thus proportional to the volume of air conveyed, irrespective of whether it is conveyed to the combustion chamber via the mixture duct or the air duct. This prevents the mixture from becoming too lean at both idle and part throttle.

Similarly, if a choke valve is provided this arrangement guarantees that the underpressure prevailing due to the adjustment of the choke is the same throughout the entire system in such a manner that under choke conditions, too, a volume of fuel adapted to the volume of air drawn in is conveyed and mixed with the air.

In order to achieve a dry, i.e. largely fuel-free, air duct at full throttle, the aperture edge of the connecting aperture and the edge of the valve overlap. Here the overlapping aperture edge can be designed as a seat for the edge of the valve and the aperture edge can also have a seal.

It is provided that the dividing wall separate air duct and mixture channel from one another downstream of the carburetor. The dividing wall is in particular eccentrically disposed relative to the intake duct. As a result, it is possible to achieve in a straightforward manner different cross-sectional areas in the air duct and in the mixture channel. In order in particular with a throttle shaft that is eccentrically disposed in the intake duct to achieve a good seal by the butterfly valve, it is provided that the edge or rim of the butterfly valve carry an elastic sealing element. To achieve different cross-sectional areas in air duct and mixture channel, it can be advantageous to dispose in one of the channels or ducts a throttle element that reduces the cross-sectional area of the channel or duct. Such a throttle element can be disposed in one of the channels in a straightforward manner. Via the selection of the magnitude of the throttle element, the desired cross-sectional area, and thus the desired ratio of fuel/air mixture to extensively fuel-free combustion air, can be easily set. The throttle element advantageously has a thickening that is disposed on the butterfly valve. The thickening can, however, also be disposed on the dividing wall or not only on the throttle element but also on the dividing wall. The throttle element can be disposed in the carburetor or in a flange that is disposed downstream of the carburetor and in which air duct and mixture channel are separated from one another by a dividing wall. The dividing wall is expediently non symmetrically embodied relative to a separating plane that extends in the direction of flow and that contains the throttle shaft.

DESCRIPTION OF PREFERRED EMBODIMENTS

The two-cycle engine 1 illustrated schematically in FIG. 1 is used as a small-volume drive engine preferably in manually operated, portable tools such as, for example, chain saws, brush cutters, parting-off grinders, etc. The displacement of an internal combustion engine of this type lies within a range of 18 cm$^3$ and 500 cm$^3$.

The two-cycle engine 1 has a cylinder 2 in which is provided a combustion chamber 3 which is delimited by a reciprocating piston 5. Via a connecting rod 6, the piston 5 drives a crankshaft 7 which is mounted in a crankcase 4 in such a manner that it can rotate.

An inlet 20, which in the illustrated embodiment is controlled by the piston skirt 30, opens into the crankcase 4. In the embodiment shown, the inlet 20 is therefore opened and closed dependent upon the stroke position of the piston 5. It can be useful to provide a membrane or diaphragm control system instead of the piston port control system illustrated. The inlet 20 then opens into the crankcase 4 outside the piston stroke area, it being necessary to position a membrane valve which opens in the direction of the crankcase 4 in the inlet 20. The opening of the inlet 20 is then controlled by underpressure.

The crankcase 4 is connected to the combustion chamber 3 via transfer passages 12,15, these transfer passages—see FIG. 2—being designed as straight or handle-shaped passages in the side wall of the cylinder. In the version illustrated, two transfer passages 12 and two transfer passages 15 are provided, one of each on either side of a plane of symmetry 19. The transfer passages 15 are located close to an outlet or exhaust 10 which conveys exhaust gases out of the combustion chamber 3 and are also referred to as exhaust transfer passages 15. The transfer passages 12 are positioned some distance from the exhaust 10 and are referred to as exhaust-distant transfer passages 12. As illustrated in the section shown in FIG. 2, the plane of symmetry 19 divides the cylinder 2 into symmetrical halves and runs roughly centrally through the exhaust 10 and the inlet 20.

The end of each transfer passage 12,15 facing the cylinder head 11 opens into the combustion chamber 3 via a transfer window or port 13,16. The transfer ports 13,16 are controlled by the piston 5 as it reciprocates, the transfer ports 13,16 being open in a lower piston position close to bottom dead center (BDC) illustrated in FIG. 1 and being closed in an upper piston position between BDC and top dead center (TDC). The ends of the transfer passages 12,15 facing the crankcase 4 are open in both the lower and the upper piston positions.

Furthermore, the transfer passages 12,15 can also be connected to an air duct 8 which opens into an air port 9 in the wall of the cylinder 2. A connecting port 14 is formed in the piston skirt 30 at the level of the air port 9 and, as illustrated in FIG. 2, extends from the air port 9 opposite the exhaust 10 in both directions around the circumference of the piston covering a circumferential angle of some 120° such that in the corresponding piston stroke position the transfer ports 13,15 communicate with the connecting port 14, the connecting port 14 being designed such that it also connects with the air port 9 of the air duct 8 in this piston stroke position. Thus, when the piston 5 rises towards TDC, a connection is made between the air duct 8 and the transfer ports 13,15 and due to the underpressure prevailing in the crankcase 4 at the time, medium is drawn in from the air duct 8 through the transfer passages 12,15.

The air duct 8 and an inlet duct 21 leading to the inlet 20 are connected separately to a mixture formation device which is a carburetor 17 in the embodiment shown. The carburetor 17 is expediently a diaphragm carburetor of the type predominantly used in drive engines in portable, manually operated tools. In the carburetor body 18 is a common intake duct 22 with a venturi 23. Also positioned in the intake duct 22 is a throttle or butterfly valve 24 which is mounted on a throttle shaft 25 in the carburetor body 18 in such a manner that it is able to rotate. The common intake duct 22 is divided by means of a partition or dividing wall 31 which extends along the longitudinal center line 43 in the direction of the air flow 26. The fuel feeders, in the embodiment illustrated idle jets 27 and a main fuel jet 28, are located on one side of the dividing wall 31 which extends essentially from one front face 29a to the other front face 29b of the carburetor body 18 along the entire length l of the intake duct 22. Here the part of the duct which contains the fuel feeders 27,28 forms an intake duct section 32 which is connected to the inlet duct 21. The other part of the duct forms an air duct 33 which is connected to the air duct 8 of the air port 9. In the area of rotation of the throttle valve 24 is a connecting aperture 34 in the dividing wall 31 which forms a connection between the intake duct section 32 and the air duct 33. This connection creates identical pressure conditions on both sides of the dividing wall 31 when the connecting aperture 34 is open. When the connecting aperture 34 is open, the diaphragm carburetor 17 therefore conveys a volume of fuel which is always proportional to the volume of air drawn in via the jets 27,28.

In the part throttle position illustrated in FIG. 1, the throttle valve is located half open transverse to the longitudinal center line 43 in the intake duct, the axis of rotation of the throttle valve being located exactly in the plane of the dividing wall 31. In this throttle valve position, the connecting aperture 34 is partially open and the fuel drawn in through the fuel jets 27 therefore enters both the intake duct section 32 and the air duct 33 via the open connecting aperture 34. At idle and/or part throttle, both the air duct 8 and the inlet duct 21 therefore convey a fuel/air mixture, it being possible, due to the arrangement of the jets in the intake duct section 32, for the fuel/air mixture conveyed in the inlet duct 21 to be richer than that conveyed in the air duct 8 into which fuel is only allowed to enter via the partially opened connecting aperture 34.

Downstream of the carburetor 17 the intake duct section 32 is connected to the inlet 20 via the inlet duct 21, and the air duct 33 is connected to the air port 9 via the connecting or air duct 8. Downstream of the carburetor 17 the air ducts 8,33 therefore run separately from the mixture ducts 21,32.

When the internal combustion engine is in operation, as the piston 5 rises towards TDC the transfer ports 13,16 and the exhaust 10 are closed. The rising piston 5 opens the inlet 20 and at the same time or a few crank angle degrees later connects the air port 9 to the transfer ports 13,16 via the connecting port 14. Thus at the same time as the air duct 8 is connected to the transfer passages 12,15 or slightly earlier, the inlet 20 to the crankcase 4 is opened, allowing the mixture to flow into the crankcase 4. When the air port 9 of the connecting port is connected to the transfer windows 13,16, a fuel-lean mixture or largely fuel-free air is drawn in and flows down through the transfer ports 13,16 to the crankcase 4. The transfer passages 12,15 thus fill with lean mixture or with largely fuel-free air, the transfer passages 15 close to the exhaust preferably being filled with air.

Following ignition, the piston 5 descends to BDC again, the flow connection between the transfer passages 12,15 and the air duct 8 being interrupted and the inlet 20 being closed. Since the piston 5 is descending, the mixture drawn into the crankcase 4 is compressed and, as the piston-controlled transfer ports 13,16 are opened, flows into the combustion chamber 3, filling it with fresh mixture for the next compression stroke. Here the fuel-lean or fuel-free air is positioned forward of the rich mixture in the crankcase 4 and scavenging losses flowing out through the open exhaust 10 are therefore largely formed by the fuel-lean mixture and the fuel-free air.

At full throttle, the throttle valve 24 is fully open as illustrated in the example of a diaphragm or membrane-controlled forward scavenging air positioning system shown in FIG. 3. When the throttle valve 24 is fully open it lies roughly parallel to the longitudinal center line 43 such that the air duct 33 and the intake duct section 32 are completely separate from each other since the throttle valve 24 preferably seals the connecting aperture 34. In order to achieve this, the connecting aperture 34 is designed with a slightly smaller throughput section than that of the valve 24 itself. The aperture edge 35 of the connecting aperture 34 and the edge 36 of the throttle valve 24 overlap one another, thereby achieving a sealed fit. Here the aperture edge 35 is expediently designed as a seat for the edge 36 of the valve, the aperture edge 35 expediently bearing a seal 37. The seal is preferably a rubber seal which may be provided in the form of a gasket or a tied-in seal. This guarantees that the air duct 8 is dry, i.e. free of fuel, at full throttle and thus that scavenging losses which occur during the scavenging of the combustion chamber 3 comprise exclusively fuel-free air.

In order to guarantee that the air duct 8,33 remains free of fuel at full throttle, the dividing wall 31 is designed to extend upstream of the carburetor 17 as far as the base 40 of an air filter 41. If the dividing wall 31' (FIG. 3) is taken into the air filter housing, preferably extended into the area of the filter element 42, it is possible to prevent fuel precipitating in the air filter 41 as a result of air pulsation in the intake train from transferring to the air duct 33.

While in the embodiment illustrated in FIGS. 1 and 2 the connection between the air ducts 8,33 and the transfer passages is controlled by piston ports, FIG. 3 shows a connection between the air duct 8 and at least the transfer passages 15 close to the exhaust port via a distributor duct 38 and a non-return valve which is designed as a membrane valve 39 in the embodiment. The distributor duct 38 can be designed as an external duct, a hose connection or a duct integrated into the cylinder 2. As the piston 5 rises, underpressure is created in the crankcase 4 and also in the transfer passages 12,15 due to the fact that these transfer passages 12,15 are open to the crankcase 4. Due to the pressure difference thus created at the membrane valve 39, the membrane valve 39 opens and fuel-lean mixture/fuel-free air is drawn into the transfer passage 15 close to the exhaust via the membrane valve 39. As the piston 5 descends, the overpressure which builds up in the crankcase 4 closes the membrane valve 39. It can also be useful to connect the transfer passages 12 to the air duct via a non-return valve such as a membrane valve, e.g. via a controlled connection to the distributor duct 38.

Figure 4:
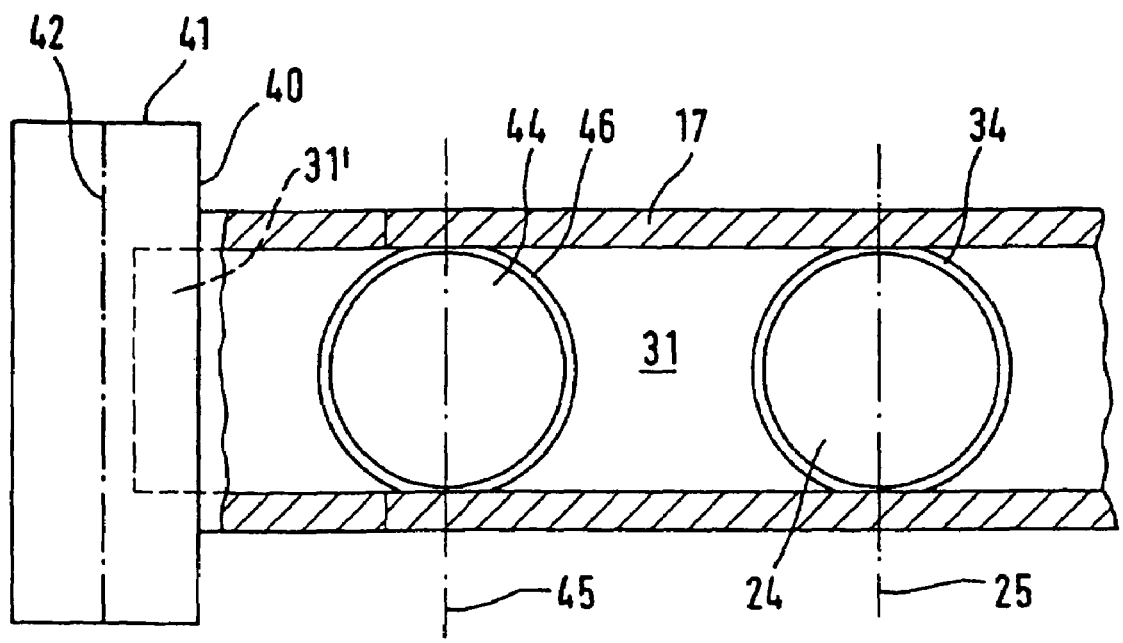
FIG. 4 is a schematic sectional view through a carburetor with a throttle valve and a choke valve.

In the embodiment illustrated in FIG. 4, a choke valve 44 is provided upstream of the throttle valve 24 and is mounted on a choke shaft 45 in the carburetor 17 or the carburetor body 18 in such a manner that it can rotate. The choke shaft 44 is located in the plane of the dividing wall 31,31'. The choke valve 44 is associated with a further connecting aperture 46 in the dividing wall 31, whereby when the choke valve 44 is in the open position illustrated in FIG. 4 the further connecting aperture 46 is largely closed by the choke valve 44. Here it is possible to provide sealing measures such as those which have already been described in relation to the throttle valve 24. This design guarantees that when the choke and the partially opened throttle valve 24 are actuated, the higher intake underpressure produced takes effect in both the air duct and the mixture duct, the pressure conditions in the venturi are therefore identical and a volume of fuel proportional to the volume of air drawn in is metered.

Figure 5:
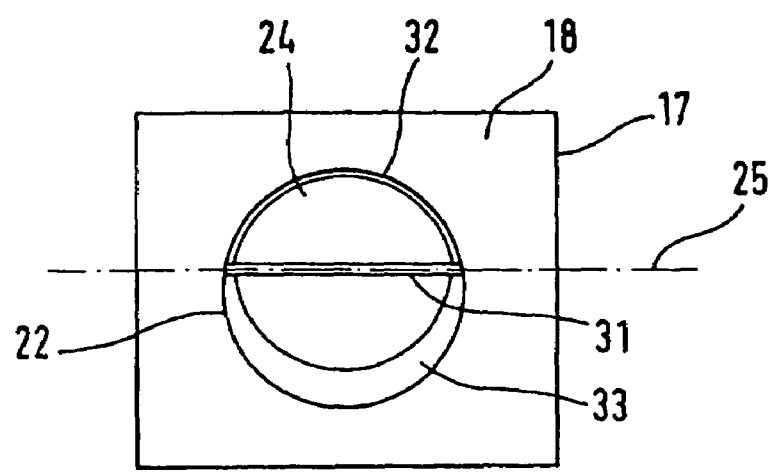
FIG. 5 is a schematic view of the front face of a carburetor with an eccentrically positioned butterfly valve shaft.

It can be expedient to position the dividing wall 31,31' in the carburetor body 18 eccentrically in relation to the intake duct 22 thereby giving the air duct 33 and the mixture duct 32 different cross sectional areas. In this case, the throttle shaft 25 and a choke shaft 45 continue to be located approximately in the plane of the dividing wall 31, but offset relative to the center of the intake duct 22. As shown in FIG. 5, the ratio A/L between the cross sectional area of the intake duct section 32 and the cross sectional area of the air duct 33 is roughly within a range of 0.5 to 1.9 and preferably within a range of 0.54 to 1.86. This means that the cross sectional area of the air duct can be between 65% and 35% of the total cross sectional area of the intake duct 22.

Figure 6:
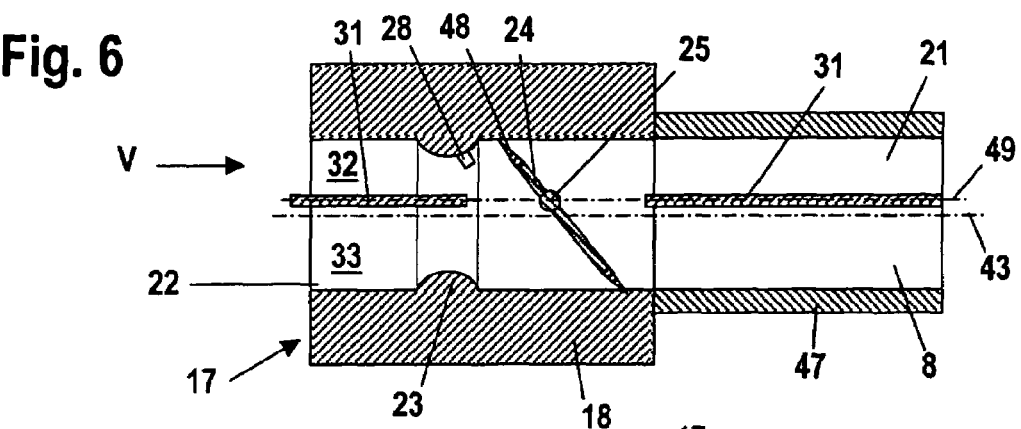
FIG. 6 is a cross-sectional view through the carburetor of FIG. 5.

FIG. 6 shows the carburetor 17 of FIG. 5 in a longitudinal cross-sectional view. Disposed downstream of the carburetor body 18 is a flange 47 in which are guided the air duct 8 and the inlet duct 21. In the flange 47, the air duct 8 and the inlet duct 21 are also separated from one another by a dividing wall 31. To ensure a good seal of the throttle or butterfly valve 24 at the intake duct 22 the edge or rim of the butterfly valve 24 is provided with a peripheral seal 48. In the completely opened position of the butterfly valve 24, the peripheral seal 48 is disposed at the edge of the connecting aperture 34 at the dividing wall 31 and in so doing entirely closes off the connecting aperture 34. The dividing wall 31 is eccentrically disposed in the intake duct 22 and in the flange 47. The dividing wall 31 extends in a separating plane 49 that is spaced from the longitudinal central axis 43 of the intake duct 22 and extends in the direction of flow 26. The separating plane 49 contains the throttle shaft 25, so that air duct 33, 8 and mixture channel or intake duct section 32, 21 are separated by one another by the dividing wall 31 not only in the carburetor 17 but also in the flange 47 in such a way that the ratio of the cross-sectional area A of the mixture channel 21, 32 to the cross-sectional area L of the air duct 8, 33 is in the range of 0.5 to 1.9, preferably in the range of approximately 0.54 to 1.86. As a result of the non-uniform division of the intake 22 there is achieved that an over proportional amount of combustion air is supplied to the two-cycle engine 1. As a result, it is possible to achieve a good rinsing of the combustion chamber 3 with the air previously collected in the transfer channels 12, 15 so that low exhaust or emission values are provided for the two-cycle engine 1.

Figure 7:
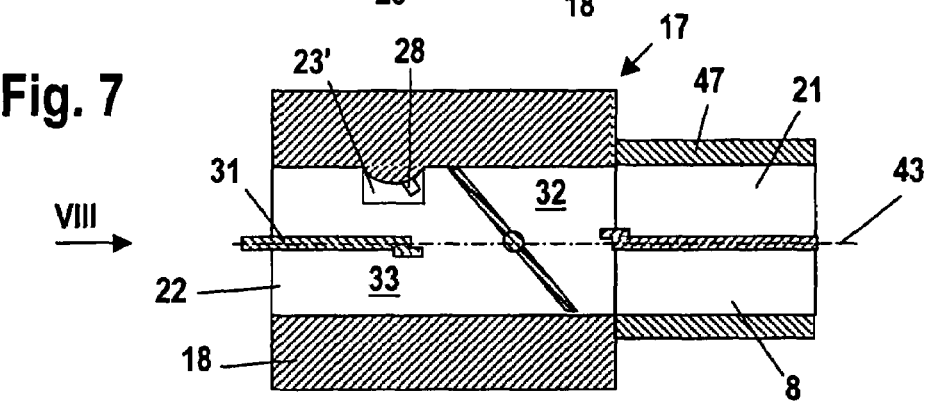
FIG. 7 is a schematic cross-sectional view through a carburetor.
Figure 8:
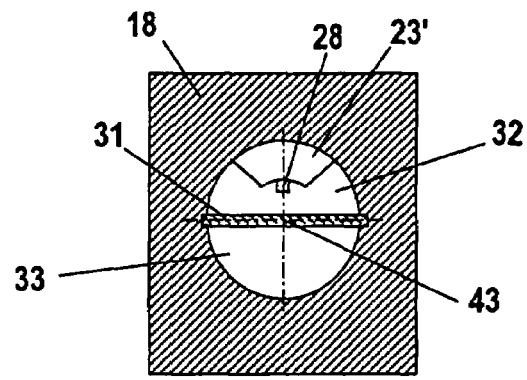
FIG. 8 is a view onto the endface of the carburetor of FIG. 7 taken in the direction of the arrow VIII in FIG. 7.

FIGS. 7 and 8 show an exemplary embodiment of a carburetor 17. The air filter, which is disposed upstream of the carburetor, is not shown in FIGS. 7 and 8. Formed in the housing 18 of the carburetor 17 is an intake duct 22 in the longitudinal direction of which extends a dividing wall 31 that separates the mixture channel 32, 21 from the air duct 33, 8. The dividing wall 31 is centrally disposed in the intake duct 22 and in the flange 47, and contains the longitudinal central axis 43 of the intake duct 22. Formed in the intake duct 22 is a venturi 23' on which is disposed a fuel opening 28. The venturi 23' extends in the intake duct section 32 over a peripheral angle in the range of from 60° to 120°. In the illustrated embodiment, the venturi 23' extends over a peripheral angle of about 90°. No venturi section is formed in the air duct 33. As shown in particular in the side view of FIG. 8, therefore only a portion of the intake duct section 32 is narrowed by the venturi 23'. The air duct 33 is not narrowed in the region of the venturi. Consequently, despite the centrally disposed dividing wall 31, there are provided at the level of the venturi different cross-sectional areas in the mixture channel 32, 21 and in the air duct 33, 8. Thus, by a suitable selection of the magnitude of the venturi 23' the ratio of the quantity of extensively fuel-free air supplied to the two-cycle engine 1 to the supply quantity of mixture can be set.

Figure 9:
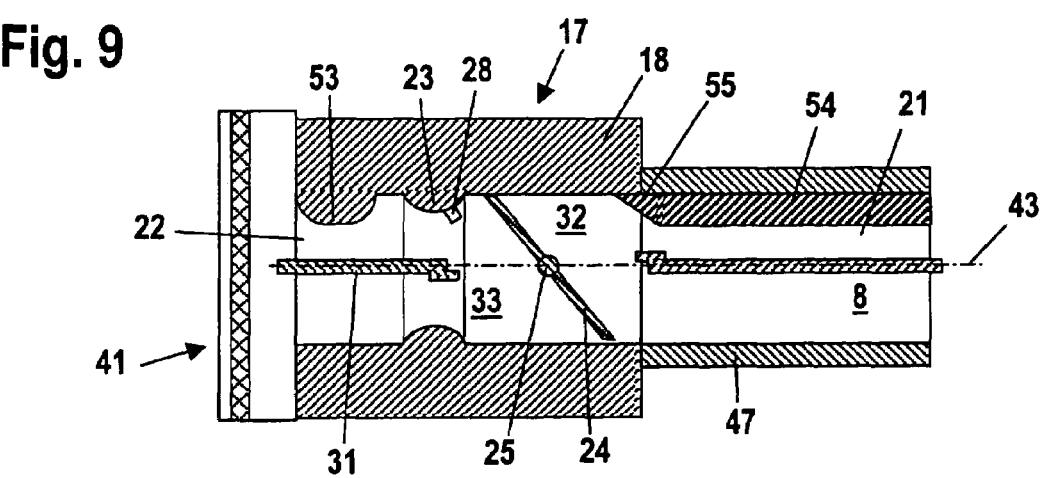
FIGS. 9–11 are schematic cross-sectional views through a carburetor.

A further embodiment of a carburetor 17 is shown in FIG. 9. A dividing wall 31 is disposed in the intake duct 22 of the carburetor 17 and in the flange 47 that is disposed downstream of the carburetor 17. The dividing wall 31 is centrally disposed in the intake duct 22 and contains the longitudinal central axis 43. To achieve different cross-sectional areas in the air duct 33, 8 and in the mixture channel 32, 21, throttle elements 53, 54 are disposed in the mixture channel 21, 32. A first throttle element 53 is disposed in the intake duct section 32 upstream of the venturi 23'. The throttle element 53 is embodied as a bead or bulge that projects into the intake duct section 32 and is disposed opposite the dividing wall 31. The throttle element 54 is disposed in the flange 47 downstream of the butterfly valve 24, and is embodied as a preferably planar wall portion of the inlet duct 21. Since the cross-sectional area is not reduced in the region of the butterfly valve 24, a ramp 55 is provided upstream of the throttle element 54 to effect a uniform reduction of the cross-sectional area in the mixture channel 21, 32. Due to the throttle elements 53, 54 different cross-sectional areas result in the air duct 8, 33 and in the mixture channel 21, 32. In this connection, however, the dividing wall 31 is centrally arranged. It is also possible to provide only a single throttle element 53, 54. Other shapes of throttle elements can also be expedient.

Figure 10:
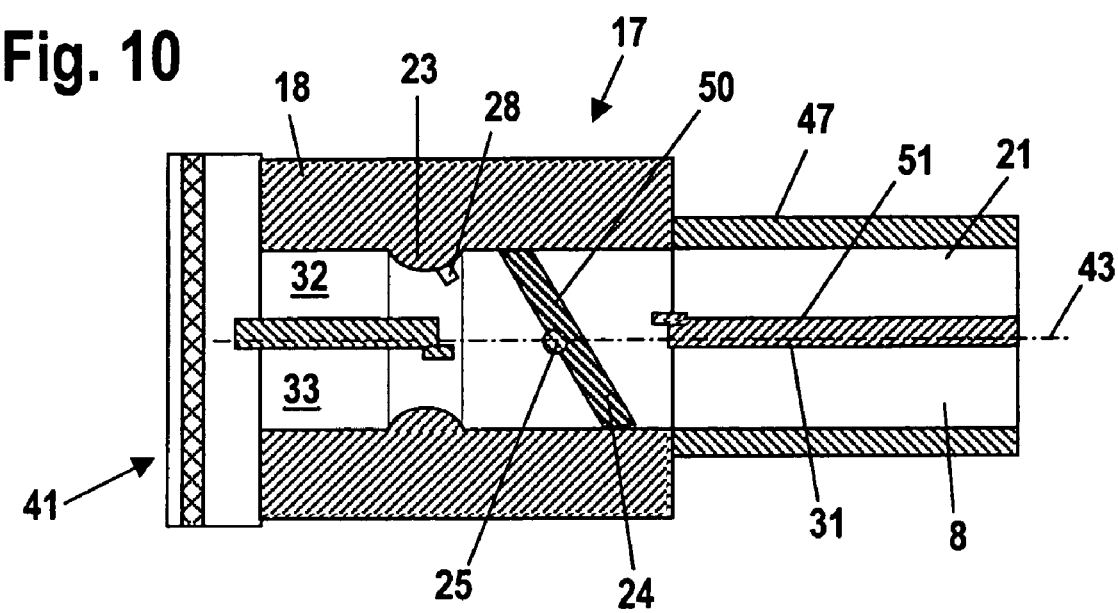

With the exemplary embodiment shown in FIG. 10, the throttling of the mixture channel 21, 32 is achieved by a thickening 51 that is disposed on the dividing wall 31. The dividing wall 31 extends over the entire carburetor 17, including into the air filter 41 upstream of the carburetor 17 and in the flange 47 downstream of the carburetor. As a result, air duct 8, 33 and mixture channel 21, 32 are separated from one another over their entire length. In addition to the thickening 51 on the dividing wall 31, a thickening 50 is disposed on the butterfly valve 24. When the butterfly valve 24 is completely closed, the thickening 50 extends into the intake duct section 32 and thus leads to a reduction of cross-sectional area in the intake duct section 32. The thickening 51 on the dividing wall 31 represents an eccentric arrangement of a thick dividing wall in the intake duct 22.

Figure 11:
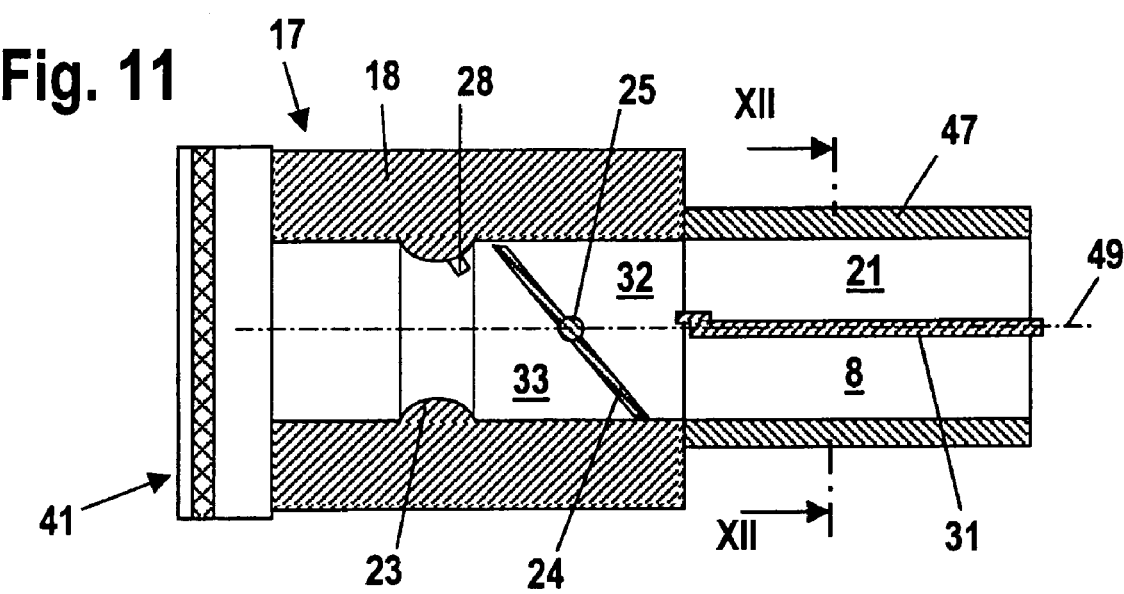
Figure 12:
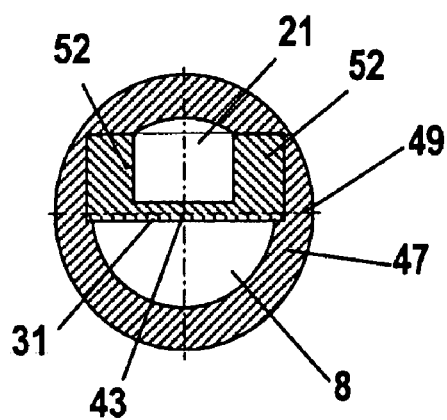
FIG. 12 is a cross-sectional view taken along the line XII—XII in FIG. 11.

A further exemplary embodiment is shown in FIGS. 11 and 12. With the embodiment shown in FIGS. 11 and 12, the dividing wall 31 extends only in the flange 47 downstream of the carburetor 17. No dividing wall 31 is provided upstream of the butterfly valve 24. The dividing wall 31 is centrally disposed in the flange 47 and contains the longitudinal central axis 43, as shown in FIG. 12. However, the dividing wall 31 is non-symmetrically embodied relative to the separating plane 49, which contains a butterfly valve 24. The dividing wall 31 has two legs 32 that project into the inlet duct 21 and laterally delimits the latter. As a result, the cross-sectional area of the mixture channel is reduced, so that there result non uniform cross-sectional areas in the mixture channel and in the air duct.

A choke valve can also be disposed upstream of the butterfly valve 24 in the embodiments shown in FIGS. 6 to 12. It can be advantageous for the cross-sectional area of the air duct to be smaller than the cross-sectional area of the mixture channel. To achieve this, it is possible, for example, to dispose a throttle element in the air duct, or the dividing wall can be offset in the direction of the air duct.

The specification incorporates by reference the disclosure of German priority document DE 101 60 5 39.0 filed 10, Dec. 2001 as well as U.S. patent application Ser. No. 10/305,616 filed Nov. 26, 2002.

The present invention is, of course, in no way restricted to the specific disclosure of the specification and drawings, but also encompasses any modifications within the scope of the appended claims.

I claim:

1. A two-cycle engine having a cylinder in which is formed a combustion chamber that is delimited by a reciprocating piston which, via a connecting rod, drives a crankshaft that is rotatably mounted in a crank-case, wherein an inlet opens into said crankcase, wherein a mixture channel opens out at said inlet, wherein a fuel/air mixture is adapted to be drawn into said crankcase, via said mixture channel, wherein at least one transfer channel is formed in said cylinder and connects said crankcase with said combustion chamber, wherein an air duct is provided that via a controllable connection is in communication with said at least one transfer channel in order, during a load state of said engine, to supply essentially fuel-free air to said at least one transfer channel, and wherein an outlet is provided on said cylinder for conveying exhaust gas away from said combustion chamber, said engine further comprising:

a dividing wall that extends in a direction of flow of air, wherein at least part of a length of said mixture channel is separated from said air duct by said dividing wall such that a cross-sectional area of said mixture channel differs from a cross-sectional area of said air duct and such that a ratio of the cross-sectional area of said mixture channel to the cross-sectional area of said air duct is approximately in a range of from 0.5 to 1.9.

2. A two-cycle engine according to claim 1, wherein said dividing wall separates said mixture channel from said air duct in such a way that said ratio of said cross-sectional area of said mixture channel to said cross-sectional area of said air duct is approximately in a range of from about 0.54 to 1.86.

3. A two-cycle engine according to claim 1, wherein said inlet communicates with an intake duct section of a carburetor, wherein a butterfly valve is provided to alter a cross-sectional area of said intake duct section, wherein during idling of said engine said butterfly valve is disposed approximately transverse to a longitudinal central axis of said intake duct section, wherein during full throttle said butterfly valve is disposed approximately parallel to said central longitudinal axis, wherein an intake duct of said carburetor is divided by said dividing wall such that a first channel portion of said intake duct, which is provided with fuel feeds, forms said intake duct section, and a second channel portion forms said air duct, wherein said dividing wall essentially extends over an entire length of said intake duct from one endface of a housing of said carburetor to an opposite endface of said housing, wherein in a pivot range of said butterfly valve in said dividing wall a connecting aperture is formed, and wherein in full throttle of said engine said connecting aperture is closed off by a fully open butterfly valve in such a way that in full throttle said air duct is separated from said intake duct section.

4. A two-cycle engine according to claim 3, wherein said butterfly valve is mounted on a shaft, that is mounted in said carburetor housing so as to be eccentric relative to a cross-sectional area of said intake duct.

5. A two-cycle engine according to claim 3, wherein an air filter is disposed upstream of said carburetor, and wherein said dividing wall extends at least to a base of said air filter.

6. A two-cycle engine according to claim 5, wherein said dividing wall extends into a housing of said air filter.

7. A two-cycle engine according to claim 3, wherein a choke valve is disposed upstream of said butterfly valve, and wherein in the region of said choke valve there is provided in said dividing wall a second connecting aperture that in an open position of said choke valve is essentially completely closed thereby.

8. A two-cycle engine according to claim 7, wherein each respective connecting aperture has a slightly smaller passage cross section than does a surface of a respective one of said valves.

9. A two-cycle engine according to claim 8, wherein an opening edge of a respective connecting aperture overlaps with an edge of the corresponding valve.

10. A two-cycle engine according to claim 9, wherein the overlapping opening edge is formed as a sealing seat for said valve edge.

11. A two-cycle engine according to claim 10, wherein said overlapping opening edge is provided with a seal.

12. A two-cycle engine according to claim 3, wherein an edge of said butterfly valve carries an elastic sealing element.

13. A two-cycle engine according to claim 1, wherein a throttle element is disposed in at least one of said air duct and said mixture channel, and wherein said throttle element reduces the cross-sectional area of said air duct or mixture channel.

14. A two-cycle engine according to claim 13, wherein said throttle element is a thickening disposed on a butterfly valve.

15. A two-cycle engine according to claim 13, wherein said throttle element is a thickening disposed on said dividing wall.

16. A two-cycle engine according to claim 13, wherein said throttle element is disposed in a carburetor.

17. A two-cycle engine according to claim 13, wherein said throttle element is disposed in a flange that is disposed downstream of a carburetor.

18. A two-cycle engine having a cylinder in which is formed a combustion chamber that is delimited by a reciprocating piston which, via a connecting rod, drives a crankshaft that is rotatably mounted in a crankcase, wherein an inlet opens into said crankcase, wherein a mixture channel opens out at said inlet, wherein a fuel/air mixture is adapted to be drawn into said crankcase, via said mixture channel, wherein at least one transfer channel is formed in said cylinder and connects said crankcase with said combustion chamber, wherein an air duct is provided that via a controllable connection is in communication with said at least one transfer channel in order, during a load state of said engine, to supply essentially fuel-free air to said at least one transfer channel, and wherein an outlet is provided on said cylinder for conveying exhaust gas away from said combustion chamber, said engine further comprising:

a dividing wall that extends in a direction of flow of air, wherein at least part of a length of said mixture channel is separated from said air duct by said dividing wall such that a ratio of a cross-sectional area of said mixture channel to a cross-sectional area of said air duct is approximately in a range of from 0.5 to 1.9, and wherein said dividing wall separates said air duct and said mixture channel from one another downstream of said carburetor.

19. A two-cycle engine having a cylinder in which is formed a combustion chamber that is delimited by a reciprocating piston which, via a connecting rod, drives a crankshaft that is rotatably mounted in a crankcase, wherein an inlet opens into said crankcase, wherein a mixture channel opens out at said inlet, wherein a fuel/air mixture is adapted to be drawn into said crankcase, via said mixture channel, wherein at least one transfer channel is formed in said cylinder and connects said crankcase with said combustion chamber, wherein an air duct is provided that via a controllable connection is in communication with said at least one transfer channel in order, during a load state of said engine, to supply essentially fuel-free air to said at least one transfer channel, and wherein an outlet is provided on said cylinder for conveying exhaust gas away from said combustion chamber, said engine further comprising:

a dividing wall that extends in a direction of flow of air, wherein at least part of a length of said mixture channel is separated from said air duct by said dividing wall such that a ratio of a cross-sectional area of said mixture channel to a cross-sectional area of said air duct is approximately in a range of from 0.5 to 1.9, and wherein said dividing wall is eccentrically disposed relative to an intake duct.

20. A two-cycle engine having a cylinder in which is formed a combustion chamber that is delimited by a reciprocating piston which, via a connecting rod, drives a crankshaft that is rotatably mounted in a crankcase, wherein an inlet opens into said crankcase, wherein a mixture channel opens out at said inlet, wherein a fuel/air mixture is adapted to be drawn into said crankcase, via said mixture channel, wherein at least one transfer channel is formed in said cylinder and connects said crankcase with said combustion chamber, wherein an air duct is provided that via a controllable connection is in communication with said at least one transfer channel in order, during a load state of said engine, to supply essentially fuel-free air to said at least one transfer channel, and wherein an outlet is provided on said cylinder for conveying exhaust gas away from said combustion chamber, said engine further comprising:

a dividing wall that extends in a direction of flow of air, wherein at least part of a length of said mixture channel is separated from said air duct by said dividing wall such that a ratio of a cross-sectional area of said mixture channel to the cross-sectional area of said air duct is approximately in a range of from 0.5 to 1.9, and wherein said dividing wall is non symmetrically embodied relative to a separating plane that contains a throttle shaft that extends in said direction of flow of air.

* * * * *